(12) United States Patent
Uchida et al.

(10) Patent No.: US 9,851,136 B2
(45) Date of Patent: Dec. 26, 2017

(54) REFRIGERATING DEVICE FOR CONTAINERS

(71) Applicant: DAIKIN INDUSTRIES, LTD., Osaka-shi, Osaka (JP)

(72) Inventors: Kouji Uchida, Osaka (JP); Naoki Nakatani, Osaka (JP); Shuuhei Yamaguchi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 184 days.

(21) Appl. No.: 14/891,868

(22) PCT Filed: Jun. 17, 2014

(86) PCT No.: PCT/JP2014/003254
§ 371 (c)(1),
(2) Date: Nov. 17, 2015

(87) PCT Pub. No.: WO2014/203522
PCT Pub. Date: Dec. 24, 2014

(65) Prior Publication Data
US 2016/0091237 A1 Mar. 31, 2016

(30) Foreign Application Priority Data

Jun. 19, 2013 (JP) .................. 2013-128800
Nov. 29, 2013 (JP) .................. 2013-247932

(51) Int. Cl.
*G05F 3/06* (2006.01)
*F25B 49/02* (2006.01)
*F25B 27/00* (2006.01)

(52) U.S. Cl.
CPC ............ *F25B 49/025* (2013.01); *F25B 27/00* (2013.01); *F25B 2600/021* (2013.01); *Y02B 30/741* (2013.01)

(58) Field of Classification Search
CPC .. F25B 49/025; F25B 27/00; F25B 2600/021; Y02B 30/741
(Continued)

(56) References Cited

U.S. PATENT DOCUMENTS

2010/0070081 A1* 3/2010 Takaoka ............... F25D 29/003
700/275
2013/0057236 A1* 3/2013 Hsu ........................ H02J 3/383
323/268

FOREIGN PATENT DOCUMENTS

CN 2202315 Y 6/1995
EP 1 512 565 A1 3/2005
(Continued)

OTHER PUBLICATIONS

International Search Report, dated Sep. 9, 2014, issued in PCT/JP2014/003254.

*Primary Examiner* — Thomas Skibinski
(74) *Attorney, Agent, or Firm* — Birch, Stewart, Kolasch & Birch, LLP

(57) ABSTRACT

In this container refrigerator, the permissible equivalent negative-phase-sequence current of a generator to be connected is calculated in Step S3 based on its capacitance. Next, in Step S4, the power consumption of an inverter device to generate the equivalent negative-phase-sequence current is calculated. Then, in Step S6, the equivalent negative-phase-sequence current generated by the container refrigerator is calculated based on the power consumption of this inverter device. Thereafter, in Step S9, $I_t$ is compared to $I_{tg}$. If $I_t > I_{tg}$ is satisfied, $I_t$ is restricted until $I_t \leq I_{tg}$ is met by lowering the output frequency of the inverter device repeatedly in multiple stages. Consequently, even if the generator connected has small capacitance, the operation may be continued at a number of rotations appropriate for that small
(Continued)

capacitance without causing the generator to overheat or be burned out.

6 Claims, 3 Drawing Sheets

(58) Field of Classification Search
USPC .................................... 307/151; 62/132–230
See application file for complete search history.

(56) References Cited

FOREIGN PATENT DOCUMENTS

| | | |
|---|---|---|
| JP | 1-171534 U | 12/1989 |
| JP | 7-36446 Y2 | 8/1995 |
| JP | 2005-265252 A | 9/2005 |
| JP | 2011-112270 A | 6/2011 |

* cited by examiner

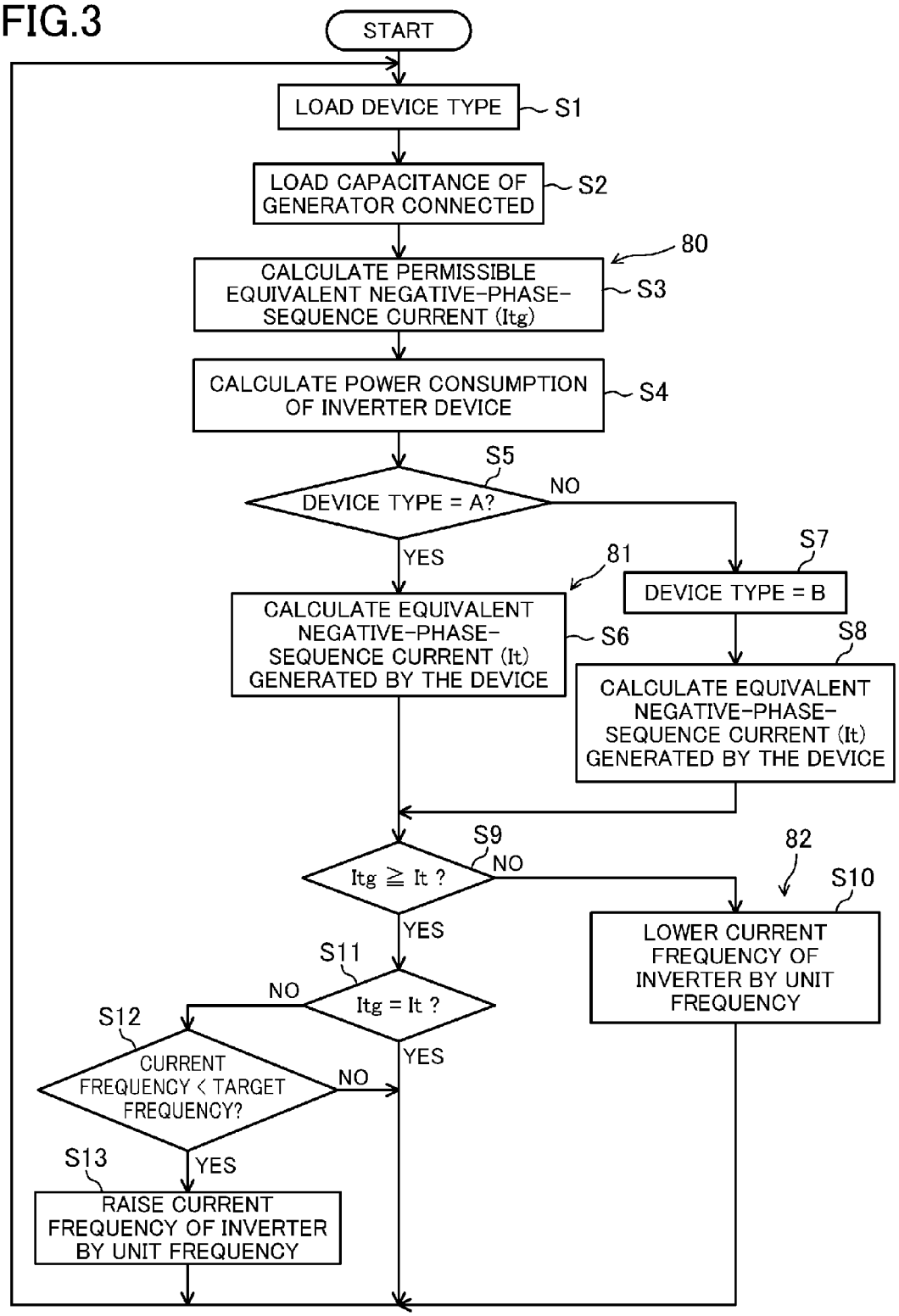

REFRIGERATING DEVICE FOR CONTAINERS

TECHNICAL FIELD

The present invention relates to a container refrigerator, and more particularly relates to a refrigerator operating with a generator connected thereto as its power supply.

BACKGROUND ART

As disclosed in Patent Document 1, for example, some conventional container refrigerators may adopt a technique for performing a variable control on their refrigeration capacity by controlling the number of rotations of a compressor motor using a power converter such as an inverter device.

Not a few of such container refrigerators operate with a generator connected thereto as their power supply. In that case, if, while the container refrigerator is operating, an inverter device is activated to control the number of rotations of its built-in compressor, then some harmonic current would be generated, since the power supplied to the built-in compressor needs to be converted through a frequency control such as a PWM control. In that case, the harmonic current could be induced in the field winding of the generator connected, for example, thus heating the rotor and other parts to raise the temperature of the generator so much as to result in a burnout.

Thus, to overcome such a problem, in compliance with the regulation established by the Japan Electrical Manufacturers' Association (JEMA) standard JEMA-1354, the harmonic current involved with the operation of the inverter device, for example, is replaced with equivalent negative-phase-sequence current such that the permissible equivalent negative-phase-sequence current flowing through the generator becomes 15% or less of the rated current of a three-phase AC generator generally used. For that reason, as the generator to be connected to the container refrigerator, a generator, of which the capacitance meets such regulation, needs to be selected.

CITATION LIST

Patent Document

PATENT DOCUMENT 1: Japanese Unexamined Patent Publication No. 2011-112270

SUMMARY OF INVENTION

Technical Problem

However, there are generators with various capacitances on the market. Thus, if a container refrigerator were operated with a generator having small capacitance connected as a power supply for the refrigerator either without taking the permissible equivalent negative-phase-sequence current into consideration or by mistake, sometimes the equivalent negative-phase-sequence current generated by the container refrigerator could exceed the permissible equivalent negative-phase-sequence current of the generator connected, thus possibly resulting in overheat or burnout of the generator.

In view of the foregoing background, it is therefore an object of the present invention to provide a container refrigerator with measures for preventing a generator connected as a power supply to the container refrigerator from overheating or being burned out, even if the generator connected unexpectedly fails to meet the standard cited above.

Solution to the Problem

To achieve this object, according to the present invention, it is the container refrigerator that detects the permissible equivalent negative-phase-sequence current of the generator connected. If the refrigerator finds the magnitude of the equivalent negative-phase-sequence current generated during its operation to be greater than that of the generator's permissible equivalent negative-phase-sequence current detected, then the refrigerator performs a control to reduce the equivalent negative-phase-sequence current generated.

Specifically, a container refrigerator according to a first aspect of the invention operates with a generator (G) connected thereto as its power supply and generates equivalent negative-phase-sequence current during its operation. The refrigerator includes: a first calculator (80) which calculates a permissible equivalent negative-phase-sequence current ($I_{tg}$) of the generator (G) connected; a second calculator (81) which calculates the equivalent negative-phase-sequence current ($I_t$) generated during the operation; and a restrictor (82) which restricts the equivalent negative-phase-sequence current ($I_t$) generated to the permissible equivalent negative-phase-sequence current ($I_{tg}$) of the generator (G) or less if the equivalent negative-phase-sequence current ($I_t$) generated that has been calculated exceeds the permissible equivalent negative-phase-sequence current ($I_{tg}$) of the generator (G).

In the container refrigerator according to the first aspect of the invention, if the equivalent negative-phase-sequence current generated that has been calculated exceeds the permissible equivalent negative-phase-sequence current of the generator, then the restrictor restricts the equivalent negative-phase-sequence current generated to the permissible equivalent negative-phase-sequence current of the generator or less. This thus prevents reliably the generator from overheating or being burned out.

A second aspect of the invention is an embodiment of the container refrigerator. In the second aspect, the container refrigerator includes: a power converter (65) which converts power supplied from the generator (G) and supplies the converted power to a predetermined component device (CM); and a controller (75) which controls the frequency of the power converted by the power converter (65). The restrictor (82) controls the controller (75) to lower the frequency of the power converted by the power converter (65) if the equivalent negative-phase-sequence current ($I_t$) generated that has been calculated exceeds the permissible equivalent negative-phase-sequence current ($I_{tg}$) of the generator (G).

In the container refrigerator according to the second aspect of the invention, if the equivalent negative-phase-sequence current generated that has been calculated exceeds the permissible equivalent negative-phase-sequence current of the generator, then a control is performed to lower the frequency of the power converted by a power converter such as an inverter device. Thus, the harmonic current generated in the generator decreases to the point that the equivalent negative-phase-sequence current generated is reduced reliably to the permissible equivalent negative-phase-sequence current of the generator or less.

A third aspect of the invention is an embodiment of the container refrigerator. In the third aspect, the second calculator (81) calculates a power to drive the power converter (65) by subtracting a power to drive a component device (CFM, EFM) generating no harmonics from a power to drive the container refrigerator, and also calculates, based on the power (kWI) to drive the power converter (65) that has been calculated, the equivalent negative-phase-sequence current ($I_t$) generated.

The container refrigerator according to the third aspect of the invention calculates the equivalent negative-phase-sequence current based on only the power to drive the power converter that generates the equivalent negative-phase-sequence current. This thus allows for calculating accurately the equivalent negative-phase-sequence current generated.

A fourth aspect of the invention is an embodiment of the container refrigerator. In the fourth aspect, the second calculator (81) has an equation for calculating the equivalent negative-phase-sequence current ($I_t$) generated in association with multiple different kinds of container refrigerators, and calculates, by an equation associated with its own container refrigerator, the equivalent negative-phase-sequence current ($I_t$) generated.

In general, the value of equivalent negative-phase-sequence current generated varies according to whether or not any noise reducing device such as a reactor or a noise filter is provided for the refrigerator and depending on the magnitude of its noise reduction effect. However, the container refrigerator according to the fourth aspect of the invention uses an equation for calculating the equivalent negative-phase-sequence current that is well suited to its own container refrigerator. This thus allows the refrigerator to calculate accurately the equivalent negative-phase-sequence current generated.

Advantages of the Invention

The container refrigerator according to the first and second aspects of the invention described above reliably restricts the equivalent negative-phase-sequence current generated to the permissible equivalent negative-phase-sequence current of the generator or less. Thus, even if a generator having too small capacitance has been selected as the generator to connect either by forgetting to choose a generator having appropriate capacitance or by mistake, the generator is still prevented from overheating or being burned out.

On the other hand, the container refrigerator according to the third and fourth aspects of the invention has the ability to calculate accurately the equivalent negative-phase-sequence current generated. This thus allows for preventing the magnitude of the equivalent negative-phase-sequence current generated from being estimated excessively large, and also preventing the operation of the container refrigerator from being restricted unnecessarily.

BRIEF DESCRIPTION OF THE DRAWINGS

FIG. 3 is a flowchart showing the procedure of protective control to be performed on a compressor motor for a controller included in the electric control system.

DESCRIPTION OF EMBODIMENTS

Embodiments of the present invention will now be described in detail with reference to the accompanying drawings. Note that the embodiments to be described below are merely preferred examples in nature and are not intended to limit the scope of the present invention, its applications or its use.

Embodiment

Figure 1:
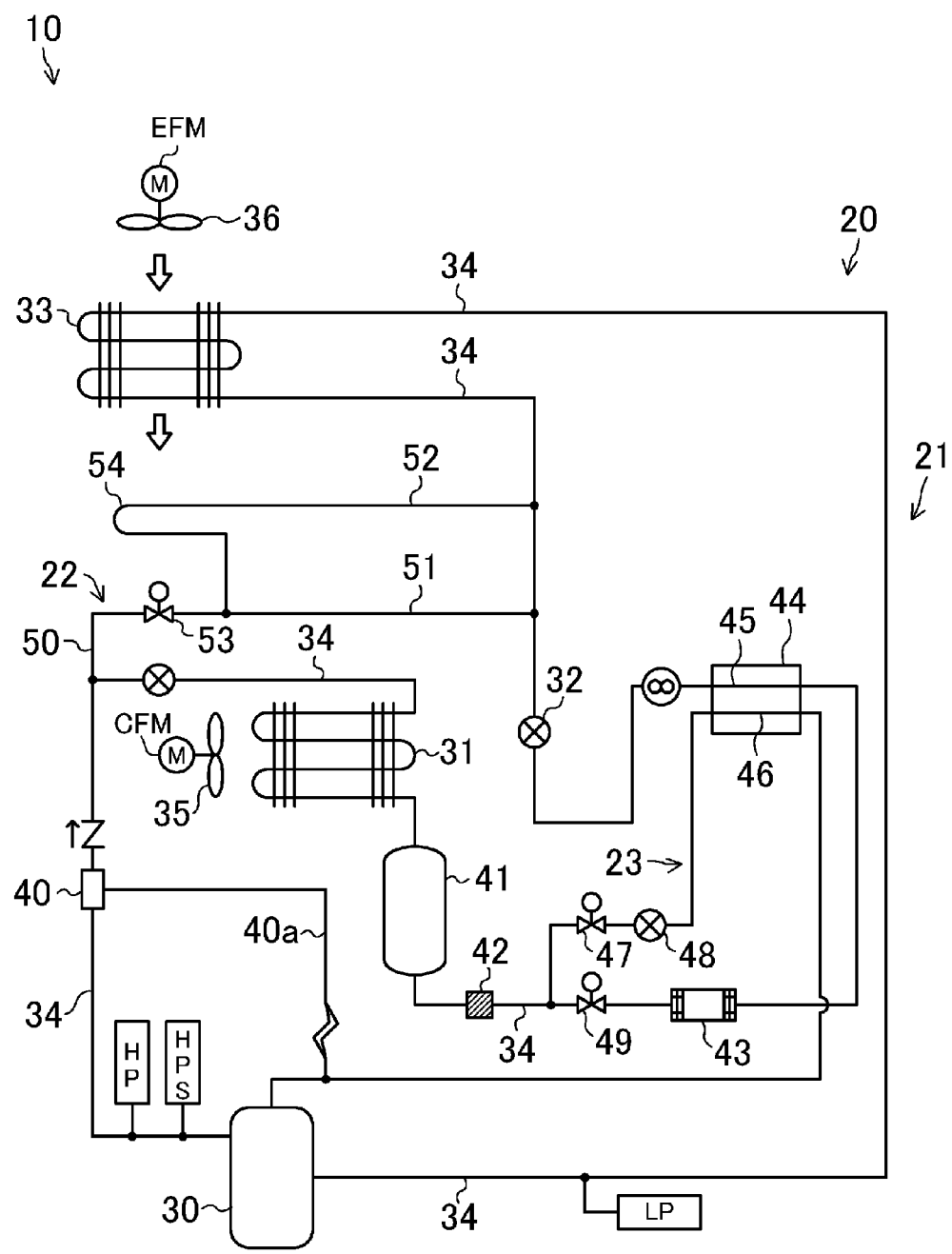
FIG. 1 illustrates a refrigerant circuit for a container refrigerator according to an embodiment.

FIG. 1 illustrates a refrigerant circuit for a container refrigerator according to an embodiment of the present invention.

As shown in FIG. 1, the container refrigerator (10) is used to cool the room inside a container (not shown), and includes a refrigerant circuit (20).

The refrigerant circuit (20) includes a main circuit (21), a hot gas bypass circuit (22) for defrosting, and a supercooling bypass circuit (23) which supercools a refrigerant.

The main circuit (21) is formed by connecting in series together a compressor (30), a condenser (31), an electric main expansion valve (32) functioning as an expansion mechanism, and an evaporator (33) in this order through a refrigerant pipe (34). The condenser (31) is provided with an outer blower fan (35) and a three-phase motor (CFM) to drive the blower fan (35), while the evaporator (33) is provided with an inner blower fan (36) and a three-phase motor (EFM) to drive the blower fan (36). The inner blower fan (36) is configured to supply cooled air that has been cooled by the evaporator (33) to the room inside the container.

An oil separator (40) is provided on the discharge side of the compressor (30). Between the condenser (31) and the main expansion valve (32), provided in this order are a receiver (41), a cooler (42) for electronic devices, a dryer (43), and a plate heat exchanger (44). An oil return pipe (40a) of the oil separator (40) is connected to a supercooling bypass circuit (23). The cooler (42) is configured to cool an electronic device such as a power switching element of an inverter device (to be described later), and cools the electronic device with a high-pressure refrigerant that has flowed through the condenser (31). The dryer (43) is configured to remove water from the liquid refrigerant that has flowed through the condenser (31).

The plate heat exchanger (44) is configured to supercool the liquid refrigerant that has flowed through the condenser (31), and includes a primary side passage (45) and a secondary side passage (46). The primary side passage (45) is connected to the main circuit (21), while the secondary side passage (46) is connected to the supercooling bypass circuit (23). The inflow end of the supercooling bypass circuit (23) is connected to a portion of the refrigerant pipe (34) between the cooler (42) and the dryer (43), while the outflow end of the supercooling bypass circuit (23) is connected to a compression chamber in an intermediate pressure state in the compressor (30).

To the inflow side of the supercooling bypass circuit (23), further connected are a first on-off valve (47) and an electric supercooling expansion valve (48) functioning as an expansion mechanism. The main circuit (21) is provided with a second on-off valve (49), corresponding to the first on-off valve (47), between a branched portion of the supercooling bypass circuit (23) and the dryer (43).

The plate heat exchanger (44) is configured to supercool the refrigerant flowing through the main circuit (21) by allowing the refrigerant that has diverged from the main circuit (21) into the supercooling bypass circuit (23) and that has had its pressure reduced by the supercooling expansion valve (48) and the refrigerant flowing through the main circuit (21) to exchange heat with each other.

The hot gas bypass circuit (22) includes a common path (50) and first and second bypass paths (51, 52) branching from the outflow end of the common path (50). The common path (50) has its inflow end connected between the oil separator (40) and the condenser (31), and is provided with a third on-off valve (53). The respective outflow ends of the first and second bypass paths (51, 52) are connected between the main expansion valve (32) and the evaporator (33). The second bypass path (52) is provided with a drain pan heater (54) to heat a drain pan arranged under the evaporator (33).

The hot gas bypass circuit (22) is configured supply a high-temperature, high-pressure gas refrigerant discharged from the compressor (30) to the evaporator (33) during a defrosting operation to be performed when evaporator (33) has frosted. The second bypass path (52) is configured to heat the drain pan during the defrosting operation.

<Operation>

Next, it will be described how the container refrigerator (10) performs a cooling operation.

First of all, during a normal cooling operation, the first and third on-off valves (47, 53) are closed and the second on-off valve (49) is open. In this state, the refrigerant discharged from the compressor (30) is condensed by the condenser (31), has its pressure reduced by the main expansion valve (32), is evaporated by the evaporator (33) and then returns to the compressor (30). After that, the refrigerant will repeatedly circulate in this order a number of times. In this manner, the evaporator (33) cools the air inside the container and the inner blower fan (36) supplies the cooled air to the room inside the container.

On the other hand, in the supercooling bypass circuit (23), when the first on-off valve (47) is opened, part of the high-pressure liquid refrigerant condensed by the condenser (31) diverges into the secondary-side passage (46), has its pressure reduced by the supercooling expansion valve (48) and then supercools the liquid refrigerant flowing through the primary-side passage (45). Then, the liquid refrigerant that has been supercooled by the primary-side passage (45) flows through the evaporator (33), while the refrigerant flowing through the secondary-side passage (46) flows into a compression chamber in an intermediate pressure state in the compressor (30). This supercooling bypass circuit (23) turns the liquid refrigerant into a supercooled state, thus improving the cooling capacity of the evaporator (33). In addition, since the refrigerant in the secondary-side passage (46) flows through the compression chamber in the intermediate pressure state in the compressor (30), the flow rate of the refrigerant circulating increases.

Also, when the evaporator (33) has frosted, a defrosting operation will be started by opening the third on-off valve (53) and closing the main expansion valve (32). During this defrosting operation, the high-temperature refrigerant gas discharged from the compressor (30) is supplied to the evaporator (33) to defrost the evaporator (33).

<Electric Control System>

Next, an electric control system which controls the compressor (30) and the respective blower fans (35, 36) of the condenser (31) and evaporator (33) of this container refrigerator will be described with reference to FIG. 2.

Figure 2:
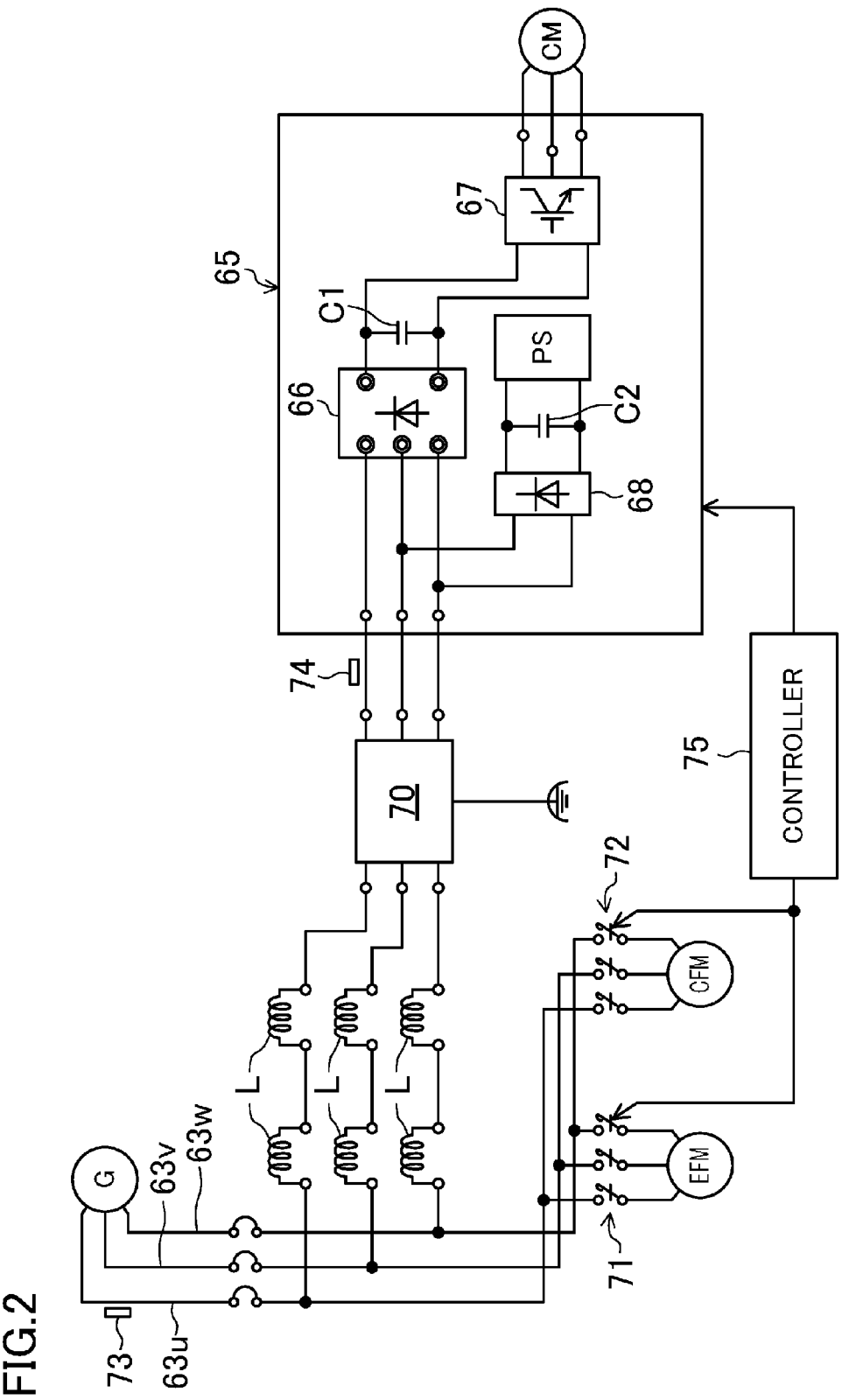
FIG. 2 is an electric circuit diagram illustrating an electric control system for the container refrigerator.

In FIG. 2, the reference sign (G) denotes a three-phase generator connected to this container refrigerator. To three-phase power lines (63u-63w) connected to this generator (G), further connected is an inverter device (65) of voltage type, for example, which functions as a power converter that converts the three-phase AC power supplied from the generator (G). The three-phase power that has been converted by this inverter device (65) is supplied to a three-phase motor (predetermined component device) (CM) to drive the compressor (30), thereby controlling the number of rotations of the compressor motor (CM).

Inside the inverter device (65), provided are a converter section (66) including six diodes which convert the three-phase voltage supplied from the generator (G) connected into direct current, a smoothing capacitor (C1) which smooths out the ripple of the direct current that has been converted by the converter section (66), and an inverter section (67) including six power switching elements such as power transistors which convert the direct current that has been smoothed by the smoothing capacitor (C1) into three-phase alternating current. The three-phase power that has been converted by this inverter section (67) is supplied to the compressor motor (CM). Inside the inverter device (65), further provided as a power supply to control the ON/OFF states of the respective switching elements in the inverter section (67) are a plurality of diode bridge sections (68) which convert the three-phase voltage supplied from the generator (G) connected into direct current, a smoothing capacitor (C2), and a switching power supply (PS) to control the respective ON/OFF states of the switching elements of the inverter section (67).

Thus, with such a configuration adopted for the inverter device (65), harmonics are generated as the respective switching elements (i.e., diodes and power transistors) that constitute the converter section (66) and inverter section (67) are turned ON and OFF. Thus, to reduce such harmonics, in the electric control system shown in FIG. 2, two AC reactors (L) are provided for each phase of (i.e., six AC reactors (L) are provided in total for) the three-phase power lines (63u-63w) between the generator (G) and the inverter device (65), and a noise filter (70) is further arranged between these AC reactors (L) and the inverter device (65).

Furthermore, in the electric control system shown in FIG. 2, the three-phase motors (CFM, EFM) to drive the respective blower fans (35, 36) of the condenser (31) and evaporator (33) are connected to the three-phase power lines (63u-63w) extended from the generator (G), and electromagnetic contactors (71, 72) to run and stop the respective motors (CFM, EFM) are arranged on those power lines (63u-63w).

In addition, a voltage sensor (73) which detects the supply voltage (V) supplied from the generator (G) is arranged on, for example, the U-phase power line (63u) connected to the generator (G), and a current sensor (74) which detects the current supplied to the inverter device (65) is arranged on the U-phase power line (63u) between the noise filter (70) and the inverter device (65).

Furthermore, the compressor motor (CM) and the respective blower fan motors (CFM, EFM) of the condenser (31) and evaporator (33) are controlled by a controller (75) to be supplied with power by the switching power supply (PS). In controlling the number of rotations of the compressor motor (CM), this controller (75) changes the value and frequency of the voltage applied to the compressor motor (CM) by pulse width modulation (PWM) control, for example, thereby converting the power to be supplied to the compressor motor (CM). Thus, this controller (75) functions as a controller which controls the frequency of the power to be converted by the inverter device (65).

Furthermore, in driving the respective blower fans (35, 36) of the condenser (31) and evaporator (33), the controller (75) runs the respective blower fans (35, 36) at a preset number of rotations by closing the electromagnetic contactors (71, 72) of those three-phase motors (CFM, EFM). The power (kWt) to be supplied for this drive is measured in advance and stored in the controller (75).

In addition, the detection signals of the voltage sensor (73) and current sensor (74) are further input to the controller (75).

<Protective Control of Generator>

Next, it will be described with reference to the control flowchart of FIG. 3 how to perform protective control in order to prevent the generator (G) connected thereto as its power supply from overheating or being burned out due to the equivalent negative-phase-sequence current generated as the converter section (66) and inverter section (67) of the inverter device (65) perform switching operations. It is the controller (75) that performs this protective control.

First of all, when this container refrigerator is installed by connecting in advance the generator (G) to this refrigerator, for example, before the controller (75) starts performing the protective control, the device type of this container refrigerator is set. Since the magnitude of the equivalent negative-phase-sequence current generated during the operation of this refrigerator varies according to the number of the AC reactors (L) shown in FIG. 2, the performance of the noise filter (70) or any other factor, this device type is determined by the combination of the number of those AC reactors (L), the presence or absence and the performance of the noise filter (70), and the stage of the number of rotations of the respective blower fans (35, 36) of the condenser (31) and evaporator (33). In the embodiment to be described below, the device type is supposed to be either Type A or Type B.

Also, at a point in time when the container refrigerator is installed, for example, the capacitance ($G_{set}$) of the generator (G) connected is set. Since this generator (G) is a three-phase generator, the capacitance ($G_{set}$) of this generator (G) is expressed by the following Equation (1):

$$G_{set} = \sqrt{3} \cdot Vt \cdot I_{to} \quad (1)$$

where Vt is the rated voltage of the generator (G) connected and $I_{to}$ is the rated current.

Next, it will be described with reference to the control flowchart of FIG. 3 how the controller (75) performs the protective control.

Referring to FIG. 3, the controller (75) is loaded with the preset device type of this container refrigerator in Step S1 and then loaded with the preset capacitance ($G_{set}$) of the generator (G) in Step S2.

Subsequently, in Step S3, the controller (75) calculates the permissible equivalent negative-phase-sequence current ($I_{tg}$) of the generator (G) connected. This permissible equivalent negative-phase-sequence current ($I_{tg}$) is 15% of the rated current ($I_{to}$) according to the JEMA-1354 standard that the generator (G) connected is compliant with (i.e., $I_{tg} = I_{to} \times 0.15$), and therefore, is calculated by the following Equation (2):

$$I_{tg} = \{(G_{set} \div Vt) \div \sqrt{3}\} \times 0.15 \quad (2)$$

Thereafter, during the operation of this container refrigerator, the following processing steps are carried out. Specifically, in Step S4, the controller (75) measures the power consumption of the inverter device (65) (i.e., the power to drive the inverter device (65)). This measurement is carried out in the following manner. First of all, the controller (75) is supplied with the detection signals of the voltage sensor (73) and current sensor (74), and calculates the power to drive this container refrigerator (i.e., I×V) based on the current I and voltage V to drive this container refrigerator that have been derived from those detection signals. Next, the controller (75) is loaded with the total power (kWt) to drive the respective blower fans (35, 36) of the condenser (31) and evaporator (33) while the devices not driven by the inverter device (65), i.e., the devices generating no equivalent negative-phase-sequence current (more specifically, those blower fans (35, 36)) are running at a preset number of rotations. Then, the controller (75) calculates the power consumption (kWI) of the inverter device (65) by the following Equation (3) so as to delete the overall power (kWt) to drive those devices:

$$kWI = \sqrt{3} \cdot I \cdot V - kWt \quad (3)$$

Subsequently, from Step S5 on, the controller 75 calculates the equivalent negative-phase-sequence current ($I_t$) generated during the operation of this container refrigerator. More specifically, in Step S5, the controller recognizes the device type of its own container refrigerator. If the device type turns out to be Type A, then the controller (75) calculates in Step S6 the equivalent negative-phase-sequence current ($I_t$) by the following Equation (4) associated with Type A:

$$I_t = (Aa \times kWI + Ba) \times (C \times V - D) \quad (4)$$

In Equation (4), Aa and Ba are coefficients unique to Device Type A and obtained by measuring in advance the equivalent negative-phase-sequence current ($I_t$) with the container refrigerator of Device Type A operated, and C and D are correction coefficients for use to correct the equivalent negative-phase-sequence current ($I_t$) generated that varies according to the input supply voltage V.

On the other hand, if the device type does not turn out to be Type A as a result of Step S5, then the controller (75) determines in Step S7 that the device type is Type B. Next, in Step S8, the controller (75) calculates the equivalent negative-phase-sequence current ($I_t$) by the following Equation (5) associated with Device Type B:

$$I_t = (Ab \times kWI + Bb) \times (C \times V - D) \quad (5)$$

In Equation (5), Ab and Bb are coefficients unique to Device Type B and obtained by measuring in advance the equivalent negative-phase-sequence current ($I_t$) with the container refrigerator of Device Type B operated, and C and D are correction coefficients for use to correct the equivalent negative-phase-sequence current ($I_t$) generated that varies according to the input supply voltage V as in the situation where Device Type=Type A.

Thereafter, in Step S9, the controller (75) compares the equivalent negative-phase-sequence current ($I_t$) generated that has been calculated with respect to each device type of its own container refrigerator to the permissible equivalent negative-phase-sequence current ($I_{tg}$) of the generator (G) that has been calculated. If the equivalent negative-phase-sequence current ($I_t$) generated turns out to be higher than the permissible equivalent negative-phase-sequence current ($I_{tg}$), i.e., if $I_{tg} < I_t$ is satisfied, then the controller (75) lowers in Step S10 the current output frequency of the inverter device (65) by a unit frequency (of e.g., 10 Hz) and also lowers the frequency of the power supplied from the inverter device (65) to the compressor motor (CM) in order to prevent the generator (G) from overheating or, being burned out. Then, the process goes back to Step S1.

On the other hand, if the equivalent negative-phase-sequence current ($I_t$) generated turns out to be equal to the permissible equivalent negative-phase-sequence current ($I_{tg}$) (i.e., if $I_{tg} = I_t$ is satisfied) as a result of Step S9, then the controller (75) determines that the generator (G) not be overheated and that the current output frequency of the inverter device (65) be maintained as it is. Then, the process goes back to Step S1.

Furthermore, if the equivalent negative-phase-sequence current ($I_t$) generated turns out to be smaller than the permissible equivalent negative-phase-sequence current ($I_{tg}$) (i.e., if $I_{tg} > I_t$ is satisfied) as a result of Step S9, then the controller (75) compares in Step S12 the current output frequency of the inverter device (65) to a target frequency to be preset based on the capacity control of this container refrigerator. Only if the current output frequency turns out to be less than the target frequency (i.e., only if the current capacity of this container refrigerator is less than the target value), the controller (75) raises in Step S13 the current output frequency of the inverter device (65) by a unit frequency (of e.g., 10 Hz) to increase the frequency of the power to be supplied from the inverter device (65) to the compressor motor (CM). Then the process goes back to Step S1.

In the control flowchart shown in FIG. 3, the processing step S3 is carried out to perform the function of a first calculator (80) which calculates the permissible equivalent negative-phase-sequence current ($I_{tg}$) of the generator (G) connected based on its capacitance. The processing steps S4-S8 are carried out to perform the function of a second calculator (81) which calculates the equivalent negative-phase-sequence current ($I_t$) generated during the drive due to the operation of the inverter device (65). Furthermore, the processing steps S9 and S10 are carried out to perform the function of a restrictor (82) which restricts the equivalent negative-phase-sequence current ($I_t$) generated to the permissible equivalent negative-phase-sequence current ($I_{tg}$) of the generator (G) or less by lowering the output frequency of the inverter device (65) if the equivalent negative-phase-sequence current ($I_t$) generated that has been calculated exceeds the permissible equivalent negative-phase-sequence current ($I_{tg}$) of the generator (G).

Advantages of this Embodiment

As can be seen, according to this embodiment, the inverter device (65) controls the number of rotations of the compressor motor (CM) by changing the frequency of the power to be supplied to the compressor motor (CM). Thus, as the inverter device (65) performs the frequency control, harmonics are generated, and eventually, an equivalent negative-phase-sequence current is generated. Particularly during pull-down operation, the inverter device (65) outputs a high-frequency signal to raise the number of rotations of the compressor motor (CM) to a high level. In that case, however, high harmonics are generated and its equivalent negative-phase-sequence current increases. If the equivalent negative-phase-sequence current exceeds the permissible equivalent negative-phase-sequence current of the generator (G), then the generator (G) could overheat or be burned out in some cases.

According to this embodiment, however, the permissible equivalent negative-phase-sequence current ($I_{tg}$) of the generator (G) connected is calculated based on its capacitance, and the equivalent negative-phase-sequence current ($I_t$) generated by its own container refrigerator is calculated based on the power consumption of the inverter device (65). If the equivalent negative-phase-sequence current ($I_t$) generated is greater than the permissible equivalent negative-phase-sequence current ($I_{tg}$) of the generator (G) (i.e., if $I_{tg} < I_t$ is satisfied), then the output frequency of the inverter device (65) is lowered by a unit frequency (of e.g., 10 Hz). For example, if the current frequency is 100 Hz, then the operation is continued with the frequency lowered to 90 Hz. After that, the equivalent negative-phase-sequence current ($I_t$) generated is calculated again. If the equivalent negative-phase-sequence current ($I_t$) generated turns out to be still greater than the permissible one ($I_{tg}$), the output frequency of the inverter device (65) is further lowered by a unit frequency (of e.g., 10 Hz) to continue the operation at 80 Hz. After that, this series of processing steps will be carried out a number of times until the equivalent negative-phase-sequence current ($I_t$) generated becomes equal to or smaller than the permissible one ($I_{tg}$). In this manner, the equivalent negative-phase-sequence current ($I_t$) generated by its own container refrigerator is restricted to the permissible equivalent negative-phase-sequence current ($I_{tg}$) of the generator (G) or less. Thus, even if a generator (G) having too small capacitance has been connected by mistake, the generator (G) is still prevented reliably from overheating or being burned out while the compressor motor (CM) continued to run at a number of rotations appropriate for the small-capacitance generator (G) connected.

Furthermore, when the equivalent negative-phase-sequence current ($I_t$) generated by its own container refrigerator is calculated, the power (kWt) to drive devices generating no harmonics such as the respective blower fans (35, 36) of the condenser (31) and evaporator (33) is subtracted from the power (I×V) to drive this container refrigerator in accordance with Equation (3) described above, thereby calculating the power consumption (kWI) of only the inverter device (65) generating harmonics. Then, the equivalent negative-phase-sequence current ($I_t$) generated is calculated based on the power consumption (kWI) of the inverter device (65). This thus allows for calculating accurately the magnitude of the equivalent negative-phase-sequence current generated, and restricting reliably the equivalent negative-phase-sequence current ($I_t$) generated to the permissible equivalent negative-phase-sequence current ($I_{tg}$) of the generator (G) or less.

Moreover, in calculating, based on the power consumption (kWI) of the inverter device (65), the equivalent negative-phase-sequence current ($I_t$) generated, even if the power consumption (kWI) of the inverter device (65) remains the same, the magnitude of the equivalent negative-phase-sequence current generated may change depending on the number of AC reactors (L) provided for its own container refrigerator, the presence or absence of noise filters (70), and the operating status of the respective blower fans (35, 36) of the condenser (31) and evaporator (33). However, the equivalent negative-phase-sequence current ($I_t$) generated is calculated by an equation (which may be either Equation (4) or (5) described above) matching the type of the given device with these factors taken into account. This thus allows for calculating even more accurately the magnitude of the equivalent negative-phase-sequence current ($I_t$) generated, and restricting reliably the equivalent negative-phase-sequence current ($I_t$) generated to the permissible equivalent negative-phase-sequence current ($I_{tg}$) of the generator (G) or less.

Other Embodiments

The embodiments of the present invention described above may be modified in the following manner.

In the embodiments described above, the number of rotations of the respective blower fans (35, 36) of the condenser (31) and evaporator (33) is supposed to be controlled to a preset one during the operation. However, if the numbers of rotations are switched in two stages, e.g., from a relatively large number of rotations to a relatively small number of rotations, or vice versa, for example, the powers to drive the respective blower fan motors (CFM, EFM) in the respective stages may be stored in advance in the controller (75), and the driving power (kWt) for use in Equation (3) may be selected according to their switching state. Also, since the equivalent negative-phase-sequence current ($I_r$) generated changes with the number of rotations of those blower fans (35, 36), the coefficients Aa, Ba, Ab, Bb, C and D in Equations (4) and (5) described above may be calculated with respect to each of those different numbers of rotations.

Furthermore, in the embodiments described above, the inverter device (65) is supposed to control the number of rotations of only the compressor motor (CM) without controlling the number of rotations of the respective blower fans (35, 36) of the condenser (31) and evaporator (33). However, the present invention is also applicable in a similar manner to a situation where the number of rotations of the respective blower fans (35, 36) of the condenser (31) and evaporator (33) is controlled by making the inverter device control the frequency of the power to be supplied to those blower fans (35, 36). In that case, harmonics will be generated as a result of the frequency control by the inverter device (65) while the number of rotations of the respective blower fans (35, 36) is being controlled. Thus, the equivalent negative-phase-sequence current ($I_r$) generated may be calculated with the power consumption of this inverter device also taken into account.

Furthermore, in the embodiments described above, the power consumption (kWI) of the inverter device (65) is supposed to be calculated by subtracting the power (kWt) to drive devices generating no harmonics such as the respective blower fans (35, 36) of the condenser (31) and evaporator (33) from the power (I×V) to drive this container refrigerator. However, this is only a non-limiting example of the present invention. Alternatively, the power consumption of the inverter device (65) may be calculated directly by arranging the current sensor (74) on the generator (G) side of the inverter device (65).

Also, in the embodiments described above, the equivalent negative-phase-sequence current ($I_r$) generated is supposed to be calculated by Equation (4) or (5) described above. However, a map representing the correspondence of the power consumption (kWI) of the inverter device (65) or an input voltage (V) may be provided in advance, or another equation may also be used.

Besides, although the inverter device (65) used in the embodiments described above is a voltage type, a current type inverter device may also be used. In that case, DC reactors are arranged in the current type inverter device, and therefore, the magnitude of the equivalent negative-phase-sequence current generated changes depending on the number of those reactors arranged. That is why even in such an alternative embodiment, the device type to be recognized by the number of DC reactors and equations for calculating the equivalent negative-phase-sequence current generated which are associated with that device type and similar to Equations (4) and (5) described above are stored in advance.

Furthermore, although a container refrigerator (10) with the configuration shown in FIG. 1 is supposed to be used in the embodiments described above, the present invention is naturally applicable to a container refrigerator with any other configuration.

INDUSTRIAL APPLICABILITY

As can be seen from the foregoing description, according to the present invention, even if the generator connected has small capacitance, the generator is still reliably prevented from overheating or being burned out while the operation is continued at a number of rotations appropriate for the generator with small capacitance. Thus, the present invention is applicable effectively to a container refrigerator.

DESCRIPTION OF REFERENCE CHARACTERS

10 Container Refrigerator
30 Compressor
CM Compressor Motor (predetermined component device)
31 Condenser
33 Evaporator
35 Outer Blower Fan
36 Inner Blower Fan
CFM Motor for Condenser Blower Fan
EFM Motor for Evaporator Blower Fan
G Generator
63$u$-63$w$ Three-phase Power Line
L AC Reactor
65 Inverter Device (power converter)
66 Converter Section
67 Inverter Section
C1 Smoothing Capacitor
70 Noise Filter
73 Voltage Sensor
74 Current Sensor
75 Controller
80 First Calculator
81 Second Calculator
82 Restrictor

The invention claimed is:

1. A container refrigerator operating with a generator connected thereto as its power supply and generating equivalent negative-phase-sequence current during its operation, the container refrigerator comprising:
    a first calculator which calculates a permissible equivalent negative-phase-sequence current of the connected generator based on a predefined percentage of the connected generators rated current;
    a second calculator which calculates the equivalent negative-phase-sequence current generated during operation of the container refrigerator based on a predefined formula having one or more coefficients that vary based on a predefined type associated with the container refrigerator; and
    a restrictor which restricts the equivalent negative-phase-sequence current generated to the permissible equivalent negative-phase-sequence current of the generator or less if the equivalent negative-phase-sequence current generated that has been calculated exceeds the pettnissible equivalent negative-phase-sequence current of the generator.

2. The container refrigerator of claim 1, comprising:
    a power converter which converts power supplied from the generator and supplies the converted power to a predetermined component device; and
    a controller which controls the frequency of the power converted by the power converter, wherein
    the restrictor controls the controller to lower the frequency of the power converted by the power converter if the equivalent negative-phase-sequence current generated that has been calculated exceeds the permissible equivalent negative-phase-sequence current of the generator.

3. The container refrigerator of claim 2, wherein the second calculator calculates a power to drive the power converter by subtracting a power to drive a component device generating no harmonics from a power to drive the container refrigerator, and also calculates, based on the power to drive the power converter that has been calculated, the equivalent negative-phase-sequence current generated.

4. The container refrigerator of claim 3, wherein the second calculator has an equation for calculating the equivalent negative-phase-sequence current generated in association with multiple different kinds of container refrigerators, and calculates, by an equation associated with its own container refrigerator, the equivalent negative-phase-sequence current generated.

5. The container refrigerator of claim 2, wherein the second calculator has an equation for calculating the equivalent negative-phase-sequence current generated in association with multiple different kinds of container refrigerators, and calculates, by an equation associated with its own container refrigerator, the equivalent negative-phase-sequence current generated.

6. The container refrigerator of claim 1, wherein the second calculator has an equation for calculating the equivalent negative-phase-sequence current generated in association with multiple different kinds of container refrigerators, and calculates, by an equation associated with its own container refrigerator, the equivalent negative-phase-sequence current generated.

\* \* \* \* \*